US011498026B2

United States Patent
(12) United States Patent
Wu et al.

(10) Patent No.: US 11,498,026 B2
(45) Date of Patent: Nov. 15, 2022

(54) PROCESS AND APPARATUS FOR SEPARATING GASES

(71) Applicant: Evonik Specialty Chemicals (Shanghai) Co., Ltd., Shanghai (CN)

(72) Inventors: Zhimin Wu, Suzhou (CN); Xiaojue Chen, Shanghai (CN); Ricardo Luiz Willemann, Essen (DE)

(73) Assignee: Evonik Specialty Chemicals (Shanghai) Co., Ltd., Shanghai (CN)

( * ) Notice: Subject to any disclaimer, the term of this patent is extended or adjusted under 35 U.S.C. 154(b) by 558 days.

(21) Appl. No.: 16/305,575

(22) PCT Filed: May 31, 2017

(86) PCT No.: PCT/CN2017/086623
§ 371 (c)(1),
(2) Date: Nov. 29, 2018

(87) PCT Pub. No.: WO2017/206908
PCT Pub. Date: Dec. 7, 2017

(65) Prior Publication Data

US 2020/0316516 A1 Oct. 8, 2020

(30) Foreign Application Priority Data

May 31, 2016 (WO) ................ PCT/CN2016/084152

(51) Int. Cl.
*B01D 53/22* (2006.01)
*B01D 63/02* (2006.01)
(Continued)

(52) U.S. Cl.
CPC ......... *B01D 53/226* (2013.01); *B01D 53/228* (2013.01); *B01D 63/02* (2013.01);
(Continued)

(58) Field of Classification Search
None
See application file for complete search history.

(56) References Cited

U.S. PATENT DOCUMENTS 5,102,432 A 4/1992 Prasad
5,378,263 A 1/1995 Prasad
(Continued)

FOREIGN PATENT DOCUMENTS

CN 1063053 A 7/1992
CN 101070266 A 11/2007
(Continued)

OTHER PUBLICATIONS

Extended European Search Report dated Nov. 15, 2019 in European Patent Application No. 17805853.3, 10 pages.
(Continued)

*Primary Examiner* — Jason M Greene
(74) *Attorney, Agent, or Firm* — Oblon, McClelland, Maier & Neustadt, L.L.P.

(57) ABSTRACT

The invention relates to a process and apparatus for separation of gas mixtures with reduced maintenance costs. The process and the apparatus consist of a feed stream separation stage (1), and a retentate separation stage (2), of which both are membrane separation stages, wherein the first retentate stream (7) is heated to temperature higher than the temperature of the feed stream (5), before it is introduced to the retentate separation stage (2), and the total capacity of the membranes used in the retentate separation stage (2) is higher than the total capacity of the membranes used in the feed stream stage (1).

20 Claims, 1 Drawing Sheet

(51) Int. Cl.
*B01D 71/64* (2006.01)
*C10L 3/10* (2006.01)

(52) U.S. Cl.
CPC .............. *B01D 71/64* (2013.01); *C10L 3/104* (2013.01); *B01D 2053/224* (2013.01); *B01D 2313/18* (2013.01); *B01D 2313/22* (2013.01); *B01D 2313/24* (2013.01); *B01D 2317/022* (2013.01); *C10L 2290/06* (2013.01); *C10L 2290/10* (2013.01); *C10L 2290/46* (2013.01); *C10L 2290/548* (2013.01)

(56) References Cited

U.S. PATENT DOCUMENTS

| | | | | |
|---|---|---|---|---|
| 5,709,732 | A * | 1/1998 | Prasad ................. | B01D 53/226 95/45 |
| 5,851,266 | A | 12/1998 | Prasad et al. | |
| 6,565,626 | B1 * | 5/2003 | Baker .................. | B01D 53/226 95/47 |
| 6,648,944 | B1 | 11/2003 | Baker et al. | |
| 8,192,524 | B2 | 6/2012 | Chinn et al. | |
| 2003/0131726 | A1 * | 7/2003 | Thomas ............... | B01D 53/226 95/49 |
| 2005/0045029 | A1 | 3/2005 | Colling et al. | |
| 2010/0186586 | A1 | 7/2010 | Chinn et al. | |
| 2011/0077446 | A1 | 3/2011 | Shanbhag et al. | |
| 2013/0098242 | A1 * | 4/2013 | Ungerank ............ | B01D 53/226 95/51 |
| 2015/0336046 | A1 | 11/2015 | Ungerank et al. | |
| 2016/0144323 | A1 | 5/2016 | Visser et al. | |
| 2017/0368497 | A1 * | 12/2017 | Priske .................. | B01D 53/228 |
| 2018/0099251 | A1 | 4/2018 | Visser et al. | |

FOREIGN PATENT DOCUMENTS

| | | | |
|---|---|---|---|
| CN | 101168116 | A | 4/2008 |
| CN | 101559311 | A | 10/2009 |
| CN | 105339078 | A | 2/2016 |
| EP | 0 603 798 | A1 | 6/1994 |
| EP | 0 887 099 | A2 | 12/1998 |
| EP | 0 887 099 | A3 | 12/1998 |
| JP | 2013-128868 | | 7/2013 |
| RU | 2 035 981 | C1 | 5/1995 |
| RU | 2 322 284 | C1 | 4/2008 |
| RU | 2 456 061 | C1 | 7/2012 |
| RU | 145 348 | U1 | 9/2014 |

OTHER PUBLICATIONS

International Search Report and Written Opinion dated Sep. 8, 2017 in PCT/CN2017/086623 Filed on May 31, 2017.

Office Action dated Jul. 20, 2021, in corresponding Japanese Patent Application No. 2018-562940 (with English translation).

* cited by examiner

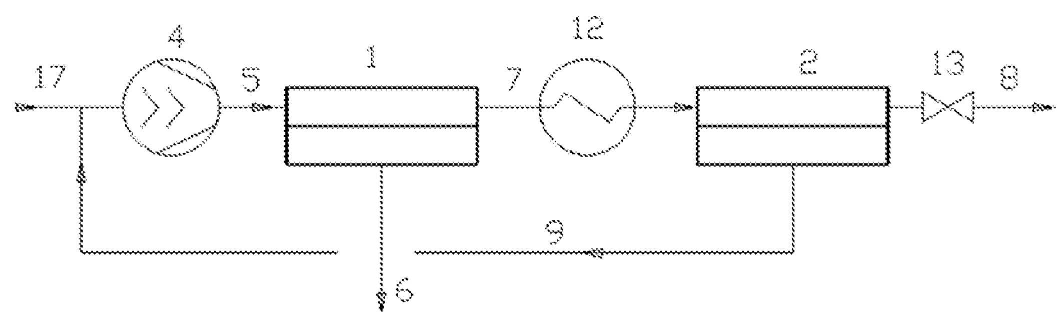
4
12
17
5
1
7
2
13
8
9
6

PROCESS AND APPARATUS FOR SEPARATING GASES

FIELD OF THE INVENTION

The invention relates to a process and an apparatus for separating gas mixtures with reduced investment and maintenance costs.

BACKGROUND it is generally known that gas mixtures can be separated by means of gas separation membranes because of different permeabilities of the individual gases, in one way, to produce such gas separation membranes, polymers are processed to give hollow fibers or flat membranes. The membranes are characterized by a very thin separation layer so that the permeance of the membrane is as large as possible.

As well as new membrane materials, different ways of connecting membranes have also been investigated in the prior art. A series of single-stage or multi-stage membrane interconnections for separating gases are known in the literature. By way of example, mention may be made here as literature sources of: Baker. IndEngChemRes, Natural Gas Processing with Membranes, 47 (2008); Bhide MemSci. Hybrid processes for the removal of acid gases from natural gas, 1998; Hhenar, MemSci Application of Cardo-type polyimide (PI) and polyphenylene oxide (PPO) hollow, 2008; EP 0 603 798; EP 0 695 574; U.S. Pat. No. 5,753,011; EP 1 634 946; EP 0 596 268; U.S. Pat. No. 6,565,626 B1; U.S. Pat. No. 6,168,649 B1 and EP 0 799 634. The specified processes have the disadvantage that they in part include a plurality of recompression steps or that either only a high purity of the permeate gas or only a high purity of the retentate gas can be achieved.

WO 2012/00727; WO 2013/098024; WO 2014/075850; KR10-1327337; KR10-1327338; U.S. Pat. No. 6,565,826 B1; U.S. Pat. No. 6,168,649 B1; JP 2009-242773 A; each disclose membrane separation processes with three membrane separation stages, wherein a retentate stream from stage 3 and a permeate stream from stages 2 are recycled to the crude gas stream. WO 2012/00727; WO 2013/098024 and WO 2014/075850 represent the most optimized of all of these processes. In said patents an apparatus and a process are described which are optimized in view of product purity in combination with the lowest energy consumption. In other words, these processes provide two high pure product streams in an energy optimized way.

In recent times, however, a new problem has occurred, that is not solved in a sufficient manner by the apparatuses and processes of the prior art. The problem is that some gas separation plants are operated at sites where energy is very cheap. At such locations the focus of operators of separation plants lies on investment and maintenance costs rather than on an energy saving. No sufficient solution for this problem has been found in the prior art.

SUMMARY OF THE INVENTION

It was thus, an object of the present invention to provide apparatuses and processes for separation and purification of gas mixtures, which have the disadvantages of the prior art only to a reduced degree, if at ail.

More particularly, processes and apparatuses, which are able to afford both, permeate gases and retentate gases in relatively high purities (for example a purity of at least 95% by volume, and preferably a purity of at least 97% by volume) are to be provided.

In a further specific object, these processes and apparatuses are to be advantageous in terms of costs, in particular of investment and maintenance costs. Especially the costs for expendable materials like the membranes should be as low as possible.

In a next specific object, a process/apparatus usable with maximum universality is to be provided for any desired gas mixtures. More particularly, it should be possible to separate gas streams which are obtained in the production of biogas and natural gas, or which comprise carbon dioxide and methane in the presence of other gases such as water, hydrogen, hydrogen sulfide.

It was a further specific object of the present invention to provide a process or an apparatus, which enables purification of methane-containing crude gas streams, with reduced methane emission compared to the prior art processes at the same throughput, and hence reduced environment pollution by this strong greenhouse gas.

Further objects, which are not stated explicitly, are evident from the overall context of the claims, description, examples and FIGURES, which follow.

It has now surprisingly been found that the process and the apparatus of the present invention can afford relatively pure streams of permeate and retentate without requiring more than one compressor respectively and without further purification of the permeate or retentate stream by other methods. The inventive apparatus thus enables simultaneous achievement of permeate and retentate streams in relatively high purity. As shown in the examples, the new process, compared to the prior art processes, in particular WO 2012/00727, can be operated with a significantly reduced overall membrane capacity to obtain similar purification results. Thus, the costs for the membranes, which are expendable goods and have to be exchanged time by time, were reduced significantly.

The inventors of the present invention surprisingly found, that an investment and maintenance cost optimum over the three-stage membrane separation disclosed in WO 2012/00727 exists. This can be realized in a two stage process or apparatus which consists of a feed stream separation stage (1), and a retentate separation stage (2) by

- raising the temperature of the first retentate stream (7) to a temperature higher than the temperature of the feed stream (5), before it is introduced to the retentate separation stage (2), in combination with
- an increase of the total membrane capacity of the retentate separation stage (2) compared to the total membrane capacities of separation stage (1).

The examples below show the investment and maintenance cost improvement over WO 2012/00727.

The present invention therefore provides a process, an apparatus and the use thereof, as described in the claims, and as defined in detail in the description, examples and FIG. 1 below.

DETAILED DESCRIPTION OF THE INVENTION

Before describing the present invention in detail hereinafter, some important terms are defined.

Membrane capacity as used in the present invention is defined as the product of the membrane surface and the permeance of the membrane at operating temperature that is determined for nitrogen (Grade 4.8) under standard conditions. Standard conditions are described in detail in section measurement methods below. Membrane surface respectively membrane area is the external surface of the membrane as macroscopically visible. For its determination it is assumed that the membrane does not have pores and the external surface is homogeneous and smooth. In other words, the membrane surface of a flat membrane calculates as the product of length and width of the flat sheet and the membrane surface of hollow fiber membranes calculates as the product of length and external circumference of the hollow fiber.

If membranes of identical materials are operated in different separation stages and if the operating temperature is identical, their permeance is identical. As consequence, the ratio of membrane capacities used in two separation stages correlates to the ratio of the membrane surfaces. If, however, membranes out of different materials are used in different stages and/or if different membranes are used in one stage and/or if different temperatures are used in different stages, the ratio of the capacities is usually different to the ratio of the membrane surfaces. Since such "mixed systems" are covered by the present invention, too, the "membrane capacity" is used as distinguishing feature instead of the "membrane surface".

It is also possible in the present invention to use more than one membrane in a separation stage. Thus, the total membrane capacity per stage has to be calculated, which is the sum of ail individual membrane capacities used in that stage.

Permeance is defined as material flow per time unit, area and differential pressure through a membrane. Permeability on the other hand is defined as material flow per time unit, area, differential pressure and layer thickness through a membrane.

The term selectivity as used and claimed in the present invention to characterize membranes, in each case is the pure gas selectivity, independent whether membranes are used to separate a two or a multigas mixture. The selectivity for hollow fiber membranes calculates as quotient of the permeances of two pure gases, and thus states how well the membrane can separate a gas mixture with regard to the two components. For flat sheet membranes, the selectivity is calculated using the permeabilities of two pure gases instead of the permeances.

Permeate refers to the overall stream obtained on the low-pressure side of the membrane, membrane module or membrane separation step. Permeate gas refers in each case to the component(s) enriched in the permeate stream relative to the respective feed stream at the membrane, at the membrane module or in the membrane separation step.

Retentate refers to the entire stream that is obtained on the high-pressure side of the membrane, membrane modules or membrane separation step, and that does not pass through the membrane.

Retentate gas refers to the component(s) enriched in each case in the retentate stream relative to the respective feed stream at the membrane, at the membrane module or in the membrane separation step.

Crude gas or crude gas mixture or crude gas stream (17) refer to a gas mixture of two or more gases respectively to a stream of this gas mixture which are to be separated using the process and/or the apparatus of the present invention. The terms "crude gas" and "raw gas" are used synonymously in the present invention.

Feed stream (5) refers to a gas stream that is supplied to the feed stream separation stage (1). This stream can correspond to raw gas stream (17), respectively to the raw gas stream (17) compressed by a compressor (4), at the start of operation of the process or apparatus of the present invention. Sometimes the raw gas comes from a sources that already has a pressure sufficient to generate the required driving force over the membranes without additional compression or otherwise generation of additional driving force, for example a vacuum device on a permeate side of a membrane separation stage or with a flushing-gas stream. In the most cases, however, the process and the apparatus of the present invention are configured such, that a compressor, upstream of the feed stream separation stage (1) and/or at feast one vacuum device in at least one of the permeate stream, are used or generate the driving force.

After recycling of the second permeate stream (9), the feed stream (5) is composed of the gases of the crude gas stream (17), and the second permeate stream (9). In this case, the feed stream (5) can be produced either by mixing stream (9) with the uncompressed crude gas stream (17), or mixing stream (9) with the compressed crude gas stream (17), or by mixing stream (9) with the crude gas stream (17) within the compressor. Combinations and not explicitly described alternatives for mixing procedures described above are also encompassed by the present invention.

Feed stream separation stage (1) refers to a membrane separation stage for separating the feed stream (5) into a first permeate stream (6) and a first retentate stream (7).

Retentate separation stage (2) refers to a membrane separation stage for separating the first retentate stream (7) into a second permeate stream (9) and a second retentate stream (8).

The herein below described preferred and specific embodiments of the process according to the present invention and also the preferred and particularly suitable designs and also the drawings and descriptions of drawings will now be used to provide a merely illustrative further elucidation of the invention; that is, the invention is not limited to these exemplary embodiments and uses or to the particular combinations of features within individual exemplary embodiments.

Individual features indicated and/or depicted in connection with concrete exemplary embodiments are not restricted to these exemplary embodiments or to the combination with the other features of these exemplary embodiments, but can be combined where technically possible with any other versions even though these are not separately discussed in the present document.

Identical reference signs in the individual FIGURES and illustrations of the drawings designate identical or similar components or components acting in an identical or similar manner. The depictions in the drawing also illustrate those features without reference signs, irrespective of whether such features are subsequently described or not. On the other hand, features, which are included in the present description but are not visible or depicted in the drawings, are also readily apparent to a person skilled in the art.

The process of the invention is a process for separating gases, which is carried out in an apparatus, which is also part of the invention, which consists of:

- a feed stream separation stage (1), and a retentate separation stage (2); and
- optionally a compressor (4) arranged up-stream of the feed stream separation stage (1) and/or at least one vacuum device, preferably a vacuum pump or blower (15), which is not shown in the FIGURE, arranged in at least one permeate stream of the feed stream separation stage (1) and/or, the retentate separation stage (2), wherein the second permeate stream (9) is fed to the feed stream (5), the feed stream separation stage (1), and the retentate separation stage (2) are membrane separation stages.

The question whether a compressor or a vacuum device is required may depend on the pressure of the source for the raw gas, if its pressure is already high enough, to ensure a sufficient driving force, i.e. partial pressure difference, over the membranes, no additional driving force generating device is necessary.

In one embodiment of the present invention, a flushing-gas stream, preferably a permeate-side flushing-gas stream, is used alone or in combination with the other devices to generate the necessary partial pressure difference.

The feed stream separation stage (1) separates a feed stream (5) comprising at least two components into a first permeate stream (6) and a first retentate stream (7). The retentate separation stage (2) separates the first retentate stream (7) into a second permeate stream (9) and a second retentate stream (8). The second permeate stream (9) is fed to the feed stream (5).

The process and apparatus of the present invention are configured such, that the second retentate stream (8) may be removed as a first product or may be further processed. It is also possible to discard the second retentate stream (8) but only if the first permeate stream (6) is withdrawn as product or further processed. Analogously the first permeate stream (6) may be removed as second product or may be further processed. The first permeate stream (6), however, may also be discarded, but only in cases where the second retentate stream (8) is the desired product, which is withdrawn or further processed.

The process and apparatus of the present invention are characterized as follows:

the first retentate stream (7) is heated to a temperature higher than the temperature of the feed stream (5), before it is introduced to the retentate separation stage (2), and the process and the apparatus are configured such that the membrane capacity, measured for nitrogen Grade 4.8 under standard conditions as defined in the measurement method section below, used in the retentate separation stage (2) in total is higher than the total membrane capacity, measured for nitrogen Grade 4.8 under standard conditions as defined in the measurement method section below, used in the feed stream separation stage (1).

The process and the apparatus of the present invention allow to produce simultaneously a retentate gas stream and a permeate gas stream, with relatively high purity. It, however, also provides the flexibility to isolate only one gas stream with high purity, if desired. Compared to the three stage processes according to WO 2012/000727 and conventional two stage processes, the process and the apparatus of the present invention allows to reduce the membrane capacities, required in sum for ail separation stages. Thus, the investment costs and in particular the maintenance costs can be reduced significantly.

It has to be acknowledged, that the achieved reduction of the total membrane capacities is encompassed by the energy consumption of the heating procedure between the two membrane separation stages, which may increase the operating costs. The process and the apparatus of the present invention are thus especially designed for plant sites, where energy, i.e. the operating costs, is very cheap and where the investment costs and the maintenance costs are the critical issue.

According to the invention, the gas separation membranes preferably have a pure gas selectivity of components A and B (=ratio of stream A to stream B through the membrane) of at least 30, preferably at least 35, more preferably at least 40, even more preferably of at least 45 and especially preferably of at least 45 to 80. Membranes of higher selectivity have the advantage that the separation becomes more effective and less permeate has to be recycled from retentate separation stage (2). Thus, especially in the case of use of a one-stage compressor (4), it is necessary to compress less gas twice, which entails economic advantages in the operation of the plant. In the case of very selective membrane modules having a selectivity of 45, only approx. 35% of the gas introduced into the feed stream separation stage (1) as crude gas need be compressed twice; with a membrane module having a selectivity of only 10, it may be the case that the double compression is up to 300%. The figures of 35% and 300% are based on experiments in which a gas mixture with equimolar amounts of components A and B (=feed) was applied, with 98.5% component B present in the retentate gas of stage (2) and 99% of component 8 in the permeate stream of stage (3). Preferably, the gas separation membranes have a pure gas selectivity as defined above for the following gas pairs: carbon dioxide and methane, hydrogen and methane, carbon monoxide and methane, helium and methane, helium and nitrogen, hydrogen and carbon monoxide, carbon dioxide and hydrocarbon, nitrogen and hydrocarbon.

As mentioned before, the process and the apparatus of the present invention are configured such, the first retentate stream (7) is heated to a temperature higher than the temperature of the feed stream (5), before it is introduced to the retentate separation stage (2).

To limit above described increase in the operating costs, it is preferable that the first retentate stream (7) is heated to a temperature 5 to 50° C., preferably 10 to 30° C. higher than the temperature of the feed stream (5), before it is introduced to the retentate separation stage (2). It is further preferable that the temperature of the feed stream (5) is in the range from 15 to 45° C., preferably in the range from 20 to 35° C. before it is introduced to the feed stream separation stage (1).

An alternative way to save the operating cost would be the control of the gas volume recycled in the second permeate stream (9). Thus the process and the apparatus of the present invention are preferably to be configured that the gas volume recycled in the second permeate stream (9) totals less than 40%, more preferably less than 30% by volume of the volume of the crude gas stream (17). The volume of the gas streams to be recycled can be controlled, for example, through selection of the respective membrane modules in the membrane separation stages (1) to (2) or by the pressures in the system or by the flows.

For the present invention it is important that the heating procedure between the two membrane separation stages is applied in combination with a total membrane capacity in the retentate separation stage (2), that is higher than that of the feed stream separation stage (1). This is in contrast to WO 2012/000727, where all separation stages have identical membrane capacities. It is preferred that the ratio of the total capacity, measured for nitrogen Grade 4.8 under standard conditions as defined in the description, of the membranes used in the retentate separation stage (2) to the total capacity, measured for nitrogen Grade 4.8 under standard conditions as defined in the description, of the membranes used in the feed stream separation stage (1) is in a range of from 1.05 to 10, particular preferred of from 1.1 to 8, more preferred of from 1.2 and 7 and most preferred of from 1.5 to 6.

The apparatus of the invention respectively used in the process of the present invention will now be described in more detail.

The apparatus of the present invention, see FIG. 1 by way of example, consists of an interlinking of two membrane separation stages. Each stage consists of one or more physical gas separation modules, which are connected directly or indirectly in parallel and/or in series within one stage. The driving force for gas separation in the modules is a partial pressure difference of the permeate gas created between the retentate and permeate sides in the respective membrane separation stage. As mentioned before, the driving force can be generated by the raw gas stream (17) itself respectively the feed stream (5). i.e. combined raw gas stream (17) and recycling stream (9), if the raw gas stream (17) has sufficient pressure. In most cases, however, the partial pressure differential will be generated either by means of a compressor (4) arranged up-stream of the feed stream separation stage, i.e. on the feed side of the feed stream separation stage (1) and/or by means of at least one, preferably one or two, vacuum device(s) (15) (not shown in FIG. 1), arranged in at least one permeate stream of the feed stream separation stage (1), and/or the retentate separation stage (2). Preferably vacuum devices (15) are located in the second permeate stream (9) on the permeate side of the retentate separation stage (2). It may optionally be advantageous, in one or more of the membrane separation stages, to generate or to enhance the partial pressure difference by means of a purge gas stream, preferably a permeate-side purge gas stream.

In a preferred configuration of the present invention, a compressor (4) brings the crude gas stream (17) or a mixture of the crude gas stream (17) and of the second permeate stream (9), as a whole or part, to the desired pressure in the range from 1 to 100 bar, but preferably to a pressure of 5 to 80 bar, particularly preferably to a pressure of 10 to 70 bar. The compressed stream represents the feed stream (5) or is combined downstream of the compressor (4) with the whole or part of the second permeate stream (9) to form feed stream (5).

The raw gas stream (17) at the start of operation of the apparatus or the process of the invention or the feed stream (5) may be introduced into the feed stream separation stage (1). The process and the apparatus of the present invention, however, may also be configured such, that the raw gas stream (17) and/or the feed stream (5) and/or a stream in an intermediate stage between raw gas stream (17) and final feed stream (5) is subjected to a pretreatment upstream of the feed stream separation stage (1). A preferred pretreatment step may be a purification step; particular preferred a dehumidification step or a desulfurization step. Several options for pretreatment steps upstream, of the feed stream separation stage (1) are known in the art and can easily be added to the process or apparatus by a man skilled in the art. For example in KR10-1327337 and in KR10-1327338 such steps are described. These documents are therefore incorporated by reference in their entirety.

In the feed stream separation stage (1), a pre-separation of the gas mixture of the feed stream (5) into more easily permeating components (permeate gas A), which pass mainly into the permeate of the first stage, and components which permeate less quickly (retentate gas B), which are predominantly retained by the membrane and are enriched in the retentate, is obtained.

The process and the apparatus of the present invention is notable in that it is preferably configured such that the concentration of at least one permeate gas of the feed stream separation stage (1), after recycling of the second permeate stream (9), is increased in the feed stream (5), preferably by at least 2% by volume, particular preferred by 2 to 40% by volume more preferably by 2 to 30% by volume and most preferably by 3 to 25% by volume, in each case compared to the concentration in the crude gas stream (17). The increase may depend on the composition of the crude gas stream (17) and is particularly high in the case of low concentrations of a permeate gas (10 to 20% by volume). Preferably, the increase in concentration of one of the permeate gases is between 2 and 40% by volume, more preferably between 4 and 25% by volume, when the content of the permeate gas in the crude gas stream (17) is between 25 and 75% by volume respectively between 9 and 25% by volume if the content of the permeate gas in the crude gas stream (17) is between 25 and 55% by volume This Is because the yield of retentate gas in the overall process increases and hence the loss of retentate gas decreases when the concentration of the permeate gas in the feed stream separation stage (1) is increased.

The cut in the separation stage for a concentration of 50% of a component A or of a permeate gas A in the feed stream (5) to be purified is between 10 and 60%, preferably between 15 and 55% and more preferably between 10 and 50%. In a particularly preferred embodiment of the present invention, the process and the apparatus of the present invention is therefore configured such that the content of permeate gas(es) of the feed stream separation stage (1) in feed stream (5) is greater than or equal to 40% by volume, preferably more than 45% by volume, based on the volume of the feed stream (5), after recycling of the second permeate stream (9).

This increase in concentration of the permeate gases in the feed stream (5), as already explained, increases the efficiency of the feed stream separation stage (1), which in turn has the result that less retentate gas B passes into the first permeate stream (6). Especially in the case of separation of methane-containing crude gases, this leads to the advantage that the unwanted emissions of methane, which is harmful to the climate, were reduced significantly.

In general, it can be stated that, in the feed stream separation stage (1), preferably 20 to 100%, more preferably 40 to 70%, of component A or of a permeate gas A are transferred from the feed stream (5) to the permeate.

Preferably, the feed stream separation stage (1) produces a permeate with a content of component A or of a permeate gas A of greater than 90%, more preferably greater than 95%. The permeate gas enriched in the first permeate stream (6) can be withdrawn as product from the apparatus or process of the invention. Alternatively it can be further processed, for example further purified or modified or mixed with other gases or liquefied. Such technologies are well known in the art and combination of such technologies with the process and apparatus of the present invention are part of this invention, too. For example in KR10-1327337; KR10-1327338 and JP 2009-242773 A, processes for further treatment of the first permeate stream (8), that can be combined with the process of the invention, are disclosed.

In a particularly preferred embodiment, The process and the apparatus of the present invention is configured such that not more than 10%, preferably not more than 5%, of the retentate component B of the feed stream separation stage (1) introduced into the apparatus with the crude gas stream (17) is comprised in the first permeate stream (6).

The retentate of the feed stream separation stage (1), is supplied by means of the first retentate stream (7) to the retentate separation stage (2) in which the fine purification is effected. On the retentate side of the retentate separation stage (2), i.e. in the second retentate stream (8), there is preferably a back pressure regulating valve (13), by means of which the main pressure in the system (operating pressure of separation stages (1) and (2)=retentate pressure of stages (1) and (2)) can be maintained and kept constant. The content of the less easily permeating components or of a retentate gas B is increased further in the retentate separation stage (2), such that the content of component B or of a retentate gas B in the second retentate stream (8) can be more than 90%, preferably more than 95% and more preferably more than 97%. In a particularly preferred variant, the process and the apparatus of the present invention is thus notable in that at least 95%, preferably at least 97% of the retentate component of the feed stream separation stage (i) which has been introduced into the apparatus with the crude gas stream (17) is obtained in the second retentate stream (8).

As mentioned before, it is possible that the second retentate stream (8) can be further processed, for example further purified or modified or mixed with other gases or liquefied. Such technologies are well known in the art and combination of such technologies with the process and apparatus of the present invention are part of this invention, too.

The stage cut of retentate separation stage (2) is preferably between 10 and 80% and more preferred between 30 and 70% for a gas mixture consisting of 50% by volume of component A and 50% by volume of Component B in the raw gas stream (17).

The second permeate stream (9) is recycled, supplied to the feed stream (5) and reprocessed. This can, as already explained above, be effected in different ways and may depend, for example, on whether a compressor (4) or even a multistage compressor (4) is used. In the case of a one-stage compressor (4), stream (9) is preferably supplied to the suction side of the compressor (4) (see FIG. 1). If a multistage compressor is used, it is preferable that stream (9) is introduced into the compressor between two compression stages. In a preferred embodiment stream (9) is recycled without total decompression into an elevated compression stage of the compressor (4) and/or the permeate of the second stage is recycled into an elevated compression stage of the compressor (4).

Since the retentate separation stage (2), in the case of decompression to feed pressure, would generally be operated in the selectivity-limited range, it may be advisable to decompress the second permeate stream (9) merely to a higher pressure level of a multistage pressure-increasing unit, i.e. of a multistage compressor (4), since this reduces the operating costs for the compression unit without distinctly worsening the separation outcome. In a particularly preferred embodiment of the present invention, therefore, a multistage compressor (4) is used and the gas stream (9) is supplied to this compressor between two compression stages.

The apparatus or the process of the present invention can in principle be implemented with all membranes which are capable of separating binary gas mixtures or multigas mixtures. The membrane materials used are preferably but not exclusively polymers. Useful polymers in the separation-active layer are more preferably polyimides, polyetherimides, polyaramides, polybenzoxazoles, polybenzothiazoles, polybenzimidazoles, polyamides, polysulfones, cellulose acetates and derivatives, polyphenylene oxides, polysiloxanes, polymers with intrinsic microporosity, mixed matrix membranes, facilitated transport membranes, polyethylene oxides, polypropylene oxides, carbon membranes or zeolites, or mixtures thereof.

Particularly preferred membranes include as materials for the separation-active layer, or as a material for the complete membrane, a polyimide consisting of the monomer units A and B, wherein

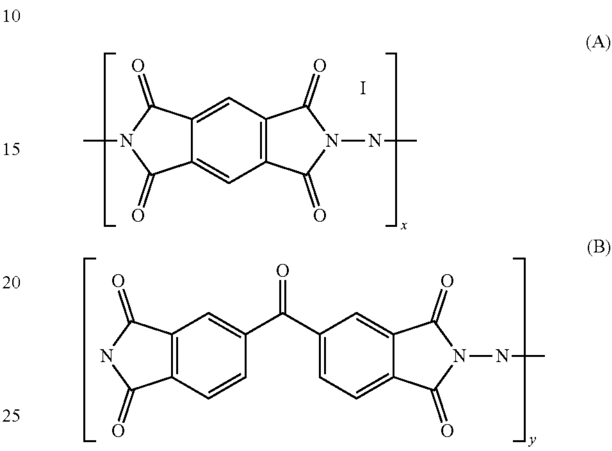

with 0≤x≤0.5 and 1≤y≤0.5 and wherein R corresponds to one or more, identical or different radicals selected from the group consisting of the radicals L1, L2, L3 and L4

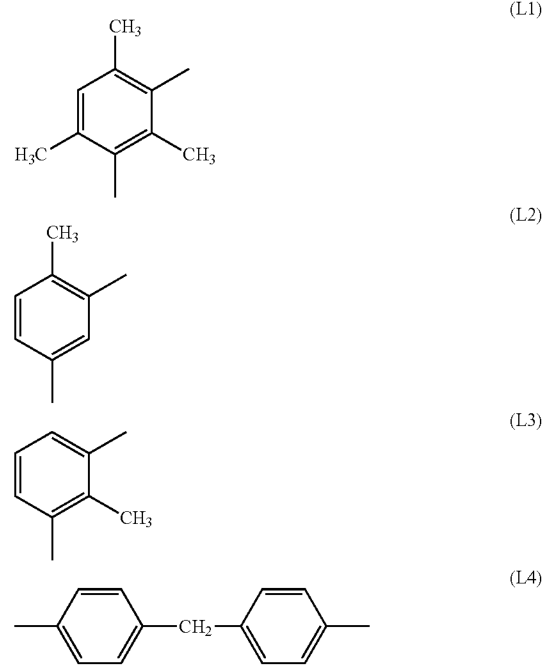

It is particularly preferable for a polymer to be used where x=0, Y=1 and R is 64 mol % L2, 16 mol % 13 and 20 mol % L4. This polymer is available from Evonik Fibres GmbH under the name P84 or P84 type 70 (CAS numbers 9046-51-9). Another polymer with specific preference is a polymer having the composition x=0.4, y=0.6 and R being 80 mot % L2 and 20 mol % L3. This polymer is available from Evonik Fibres GmbH under the name P84HT or P84 HT 325

(CAS numbers 134119-41-8). It is similarly preferable to use mixtures of said polyimides.

Membranes made of the preferred polyimides are available from Evonik Fibres GmbH under the name Sepuran®. A process for producing these preferred membranes is disclosed in WO 2011/009919 A1. Membranes disclosed in this Offenlegungsschrift can always be used with preference in the process of the present invention. To avoid pure repetition, the content of this patent application is hereby incorporated herein in its entirety by reference. It was found that these membranes gave very good separation outcomes.

The membranes are preferably used in the form of hollow fiber membranes and/or flat membranes. The membranes are assembled into modules, which are then used in the separation task. The modules used may be all gas separation modules known in the prior art, for example but not exclusively hollow fiber gas separation modules, spiral-wound gas separation modules, cushion gas separation modules or tube bundle gas separation modules.

The process and the apparatus of the present invention have the particular advantages that there might be no need for any additional purification of the permeate stream (6) and/or the retentate stream (8) for many applications. For example, in the case of purification of biogas or natural gas (removal of carbon dioxide from methane), there is no longer any need for a pressure swing adsorption or amine scrubbing for fine purification of the retentate, and so it can be fed into the natural gas grid. Nevertheless, as mentioned above, additional purification or further processing steps may follow after the process or apparatus of the present invention. As mentioned before, the fact that there is no need for further treatment of streams (6) and (8) does not exclude such steps from the scope of the present invention.

The process and the apparatus of the present invention can be used to produce, at one and the same time, a relatively pure retentate stream (8) and a relatively pure permeate stream (6) in biogas and natural gas purification. Carbon dioxide can therefore be released into the atmosphere without great losses of methane and without major impairment of the environment, without any need for further treatment of the gas by a catalytic or thermal after burn or utilization in a combined heat and power plant. No capital expenditure on further plant facilities is accordingly required, which leads to a more economical purification process for biogas and natural gas.

A further advantage is considered to be that the process and the apparatus of the present invention needs a much lower level of apparatus complexity than the conventional apparatuses and processes.

Especially through the combination of the inventive features of the heating procedure between the two membrane separation stages, and increased membrane capacity in the retentate separation stage (2) compared to that of the feed stream separation stage (1), a process or an apparatus much superior with regard to invest and in particular to maintenance costs, compared to the prior art processes can be provided.

The inventive process and apparatus according to the invention can especially be used for separation of biogas or natural gases or air or other gas mixtures comprising: carbon dioxide and methane, hydrogen and methane, carbon monoxide and methane, helium and methan, helium and nitrogen, hydrogen and carbon monoxide, permanent gas having a boiling point less than 110 Kelvin at 1 atm and non permanent gas having a boiling point above or equal to 110 Kelvin at 1 atm, carbon dioxide and hydrocarbon or nitrogen and hydrocarbon.

FIGURE

FIG. 1 shows an illustrative connection arrangement of membrane modules according to the present invention, wherein the numerals refer to the following items:

1: Feed stream separation stage
2: Retentate separation stage
4: One-stage or multistage compressor
5: Feed stream
6: First permeate stream
7: First retentate stream
8: Second retentate stream
9: Second permeate stream
12: Heater
17: Crude gas stream Measurement Methods:

Selectivity of Membranes

Gas permeabilities are reported in barriers ($10^{-10}$ $cm^3$ $cm^{-2}$·cm·$s^{-1}$·$cmHg^{-1}$). Permeances of hollow fiber membranes to gases are reported in GPU (Gas Permeation Unit, $10^{-8}$ $cm^3$·$cm^{-2}$·$s^{-1}$$cmHg^{-1}$).

Flat Membranes

For determination of the selectivity of flat membranes permeabilities to pure gases are measured by the pressure rise method. A flat sheet film between 10 and 70 μm in thickness has a pure gas applied to it from one side. On the other side, the permeate side, there is a vacuum (ca. $10^{-2}$ mbar) at the start of the test. Then, pressure rise on the permeate side over time is recorded. The polymer's permeability can be computed by the following formula:

$$P = \frac{V_{dead} \cdot MW_{gas} \cdot l}{\rho \cdot R \cdot T \cdot A \cdot \Delta p} \cdot \frac{dp}{dt} \cdot 10^{10}$$

P . . . Permeability in barrens ($10^{-10}$ $cm^{-3}$·$cm^{-2}$·$s^{-1}$·$cmHg^{-1}$)
$V_{dead}$ . . . Volume of permeate side in $cm^{-3}$
$MW_{gas}$ . . . Molar mass of gas in g·$mol^{-1}$
I . . . Thickness of film in cm
p . . . Density of gas in g·$cm^{-3}$
R . . . Gas constant in $cm^3$·cmHg·$K^{-1}$$mol^{-1}$
T . . . Temperature in kelvins (room temperature, ~23° C.)
A . . . Area of film in $cm^2$ (~12 $cm^2$)
Δp . . . Pressure difference between feed and permeate side in cmHg
dp/dt. Pressure rise per time on permeate side in cmHg·$s^{-1}$ The selectivity of the flat membrane according to the present invention for various pairs of gases is a pure-gas selectivity. It is calculated from the ratio of permeabilities of the pure gases as follows:

$$S = \frac{P_1}{P_2}$$

S . . . pure gas selectivity
$P_1$ . . . permeability of gas 1
$P_2$ . . . permeability of gas 2

Hollow Fiber Membranes

The permeance of hollow fibers is measured using a volume rise method. For this, the flux (at standard temperature and standard pressure) at the permeate site at constant pressure is measured.

For hollow fibers it is necessary to measure the permeance P/l since the thickness of the separating layer is unknown. The permeance is computed by the following formula:

$$P/l = \frac{Q(STP)}{R \cdot T \cdot A \cdot \Delta p} \cdot 10^6$$

P/l . . . permeance in GPU (gas permeation units. $10^{-6}$ $cm^3 \cdot cm^{-2} \cdot s^{-1} \cdot cmHg^{-1}$)

Q . . . gas flux of permeate side in $cm^3$ (STP)/s

R . . . gas constant in $cm^3 \cdot cmHg \cdot K^{-1} \cdot mol^{-1}$

T . . . temperature in kelvins (room temperature, ~23° C.)

A . . . membrane surface, i.e. external area as defined above, of hollow fiber in $cm^2$ (between 60 and 80 $cm^2$)

Δp . . . pressure difference between feed and permeate side in cmHg

The selectivity of the hollow fiber membrane according to the present invention for various pairs of gases is a pure-gas selectivity. It is calculated from the permeances of the pure gases as follows:

$$S = \frac{P_1}{P_2}$$

S . . . pure gas selectivity $P_1$ . . . permeance of gas 1

$P_2$ . . . permeance of gas 2

The examples which follow are intended to illustrate and describe the present invention in detail, but do not restrict it in any way.

Membrane Capacity

The calculation method as well as the reference gas and the standard conditions are described below.

Hollow Fiber Membranes:

The membrane capacity of the hollow fiber membrane (HFM) calculates as follows:

$$\text{Capacity}_{(HFM)} = \text{Permeance}_{(HFM)} * \text{Surface}_{(HFM)}$$

Wherein the permeance$_{(HFM)}$ is tested under the following standard conditions:

| | |
|---|---|
| Reference gas: | Nitrogen, Grade 4.8 |
| Temperature: | Instead of room temperature as applied above for the permeance measurement to calculate the selectivities; for the capacity calculation, the permeance is determined at the average operating temperature of the membrane, which is usually the operating temperature of the separation stage |
| Retentate pressure: | 11 bara |
| Permeate pressure: | 1.1 bara |

and the surface$_{(HFM)}$ correlates to the external membrane surface as defined in the definitions section in this disclosure.

Flat Membranes:

The membrane capacity of the flat membranes (FM) calculates as follows:

$$\text{Capacity}_{(FM)} = \text{Permeance}_{(FM)} * \text{Surface}_{(FM)}$$

Wherein the permeability$_{(FM)}$ is tested under the following standard conditions:

| | |
|---|---|
| Reference gas: | Nitrogen, Grade 4.8 |
| Temperature: | Instead of room temperature as applied above for the permeability measurement to calculate the selectivities; for the capacity calculation, the permeability is determined at the average operating temperature of the membrane, which is usually the operating temperature of the separation stage |
| Retentate pressure: | 11 bara |
| Permeate pressure: | 1.1 bara |

The permeance is then calculated by dividing the permeability through the thickness of the FM. The surface$_{(FM)}$ correlates to the external membrane surface as defined in the definitions section in this disclosure.

The examples provided below are intended to illustrate the invention in more detail for a deeper understanding. They must not be construed in any way to limit the scope of the present invention.

EXAMPLES

In all examples and comparative examples the membrane capacity relates to nitrogen (Grade 4.8) und were measured under the standard conditions described above.

General Description of the Simulation:

The simulation is based on the following assumptions:

- Steady state
- Ideal gas
- Ideal counter current in the membrane module
- No viscosity effects (no pressure loss on retentate or permeate flow)
- No sweep gas
- Constant temperature within each separation stage. Unless otherwise stated all separation stages in the examples are operated at identical temperatures.

The simulation is done as follows:

The following scheme of two flow channels separated by a membrane (double dotted line) was used to derive the equations needed for the simulation. NFi is a molar flow of component i at the high pressure side of the membrane. NPi is a molar flow of component i at the low pressure side of the membrane. Regarding to this scheme a feed entering the membrane is the sum of all molar component flows NFi (z=0) entering the membrane. Consequently, the retentate flow exiting the membrane is the sum of all molar component flows NFi (z=L). The permeate flow exiting the membrane is the sum of all molar component flows NPi (z=0). As there is no sweep flow entering the membrane on the opposite side of the permeate outlet these molar component flows NPi (z=L) are set to be zero.

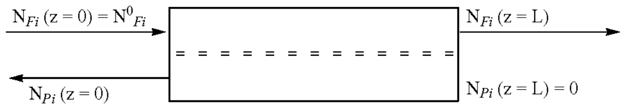

The local molar flow of a component i through the membrane is its molar permeance Pi times the membrane area Udz times its local driving force, the local difference in partial pressure between feed and permeate side. pF and pP are the feed and the permeate pressure. The local molar concentration of component i on the feed or permeate side can be derived dividing the local molar feed or retentate flow of component i by the sum of all local molar component flows. From this the following set of equations can be derived.

$$\frac{d\dot{N}_{Fi}}{dz} = \dot{P}_i \cdot U\left(\frac{\dot{N}_{Fi}}{\sum_j \dot{N}_{Fj}} \cdot p_F - \frac{\dot{N}_{Pi}}{\sum_j \dot{N}_{Pj}} \cdot p_P\right)$$

$$\frac{d\dot{N}_{Pi}}{dz} = \dot{P}_i \cdot U\left(\frac{\dot{N}_{Fi}}{\sum_i \dot{N}_{Fj}} \cdot p_F - \frac{\dot{N}_{Pi}}{\sum_j \dot{N}_{Pj}} \cdot p_P\right)$$

Including the boundary conditions described above the equations was solved in software Aspen Custom Modeler (ACM), however, other softwares like MATLAB, MathCad can also be used.

Example 1

Separation of a Mixture of Methane and Carbon Dioxide with a Mixing Ratio of 60 to 40 with a Polyimide Membrane The FIG. 1 shown connection arrangement was used. Each stage consisted of a hollow fiber membrane module consisting of hollow polyimide fibers from Evonik Fibres GmbH (Sepuran® Green 4 inch, 1.2 meters length). The membranes used exhibited a pure gas selectivity for carbon dioxide over methane of 50.

A 1000 $m^3$/h biogas upgrading process was reached through simulation wherein the feed separation stage (1) consisted of 12 membrane modules, and the retentate separation stage (2) consisted of 24 membrane modules. All membrane modules have identical membrane area and identical permeance for $N_2$ Grade 4.8 under standard conditions. Thus, the total capacity of the membranes of retentate separation stage (2) is twice as high as that of the feed stream separation stage (1).

After steady state was reached, the feed stream (5) comprising the crude gas (17) and the second permeate stream (9) was compressed to 13 Bar and regulated to 25° C., and then was passed to the feed stream separation stage (1). The retentate stream (7) of the feed stream separation stage (1) was subsequently heated to 50° C. by a heater (12) and then passed to the retentate separation stage (2). A back pressure regulating valve (13) on the retentate side of the retentate separation stage (2) was set to 13 Bar and thus determined the driving force through the membrane of membrane separation stages (1) and (2).

The permeate of the feed separation stage (1) had a content of 4.4% methane and 95.7% carbon dioxide. 401 $m^3$/h of this mixture left the feed separation stage (1) as off-gas. The retentate of the retentate separation stage (2) had a content of 97.3% methane and 2.7% carbon dioxide. 598 $m^3$/h of this mixture left the retentate separation stage (2) as product gas. The permeate of retentate separation stage (2) had a volume flow rate of 284 $m^3$/h with a methane content of 30.9% and a carbon dioxide content of 69.1%, and was recycled via the second permeate stream (9) into the mixing chamber and compressed again by the compressor (4).

The following Table 1 shows the process parameters and the result.

Comparative Example 1

Example 1 was reproduced, except that the retentate stream (7) was not heated. The following Table 2 shows the process parameters and the result.

Comparative Example 1 resulted in lower methane purity compared with Example 1, which shows a heating procedure between the feed stream separation stage (1) and the retentate separation stage (2) improves the methane purity of the retentate stream of the retentate separation stage (2).

Comparative Example 2

Example 1 was reproduced, except that the feed stream (5) was heated to 50° C. instead of the retentate stream (7). The following Table 3 shows the process parameters and the result.

Comparative Example 2 resulted in lower methane yield compared with Example 1, which shows a heating procedure between the feed stream separation stage (1) and the retentate separation stage (2) is better than a heating procedure up-stream the feed stream separation stage (1) in terms of the methane yield.

Comparative Example 3

Example 1 was reproduced, except that the feed stream separation stage (1) and the retentate separation stage (2) had the same membrane capacity. The following Table 4 shows the process parameters and the result.

Comparative Example 3 resulted in lower methane yield compared with Example 1, which shows a higher membrane capacity of the retentate separation stage (2) than the feed stream separation stage (1) resulted in a better methane yield. It further shows, that the purity of carbon dioxide in the first permeate stream (6) decreases. Thus, if it is desired to remove the first permeate stream (6) as the only or a second pure product, Example 1 with an increased higher membrane capacity in the retentate separation stage (2), due to the effects of the capacity on recycling stream (9), provides significantly better results.

Comparative Example 4

Example 1 was reproduced, except that the retentate stream (7) of the feed stream separation stage (1) was not heated, and the membrane capacity of the retentate separation stage (2) was adjusted.

A 1000 $m^3/h$ biogas upgrading process with methane purity and yield similar as Example 1 was reached through simulation until the retentate separation stage consisted of 34 membrane modules. The following Table 5 shows the process parameters and the result.

Example 1 and Comparative Example 4 resulted in exactly the same methane purity and yield. However, Example 1 needs much less membrane modules (capacity) for the retentate separation stage (2).

Comparative Example 5

A three stage process according to the FIG. 12 of WO2012/00727 was simulated for reference, with each of stages having the same membrane capacity. The membrane modules used in this comparative example was the same as Example 1.

Comparative Example 5 differed from Example 1 in that:

1) the first retentate stream (7) was not heated;

2) the first permeate stream (6) was introduced to a third membrane stage;

3) the third retentate stream (10) and the second permeate stream (9) were recycled together into the mixing chamber and compressed again by the compressor (4);

4) the third permeate stream (11) was taken out as an off-gas.

A 1000 $m^3/h$ biogas upgrading process with methane purity as Example 1 was reached through simulation until the each separation stage consisted of 23 membrane modules. The following Table 6 shows the process parameters and the result.

Although Comparative Example 5 resulted in slightly higher methane yield compared to Example 1, the total number of the membrane modules (membrane capacity) is almost twice the total number of the membrane modules (membrane capacity) of Example 1, which shows Example 1 has a significant advantage in terms of the investment and maintenance cost.

Example 2

Separation of a Mixture of Methane and Carbon Dioxide with a Mixing Ratio of 60 to 40 with a Polyimide Membrane The FIG. 1 shown connection arrangement was used. Each stage consisted of a hollow fiber membrane module consisting of hollow polyimide fibers from Evonik Fibres GmbH (Sepuran® Green 4 inch, 1.2 meters length). The membranes used exhibited a pure gas selectivity for carbon dioxide over methane of 40.

A 1000 $m^3/h$ biogas upgrading process was reached through simulation wherein the feed separation stage consisted of 11 membrane modules, and the retentate separation stage consisted of 25 membrane modules. Alt membrane modules have identical membrane area and identical permeance for $N_2$ Grade 4.8 under standard conditions. Thus, the total capacity of the membranes of retentate separation stage (2) is 2.27 times higher than that of the feed stream separation stage (1).

After steady state was reached, the feed stream (5) comprising the crude gas (17) and the second permeate stream (9) was compressed to 13 Bar and regulated to 25° C. and then was passed to the feed stream separation stage (1). The retentate stream (7) of the feed stream separation stage (1) was subsequently heated to 50° C. by a heater (12) and then passed to the retentate separation stage (2). A back pressure regulating valve (13) on the retentate side of the retentate separation stage (2) was set to 13 Bar and thus determined the driving force through the membrane of membrane separation stages (1) and (2).

The permeate of the feed separation stage (1) had a content of 4.8% methane and 95.2% carbon dioxide. 404 $m^3/h$ of this mixture left the feed separation stage (1) as off-gas. The retentate of the retentate separation stage (2) had a content of 97.4% methane and 2.6% carbon dioxide. 596 $m^3/h$ of this mixture left the retentate separation stage (2) as product gas. The permeate of retentate separation stage (2) had a volume flow rate of 359 $m^3/h$ with a methane content of 31.3% and a carbon dioxide content of 68.7%, and was recycled via the second permeate stream (9) into the mixing chamber and compressed again by the compressor (4).

The following Table 7 shows the process parameters and the result.

Example 3

Separation of a Mixture of Methane and Nitrogen with a Mixing Ratio of 80 to 20 with a Polyimide Membrane The simulation calculation of Example 1 was repeated for a natural gas of 80 mol-% methane and 20 mol-% nitrogen, membranes with a mixed gas selectivity for nitrogen over methane of 4 and a pure gas selectivity of 5.8, a feed separation stage (1) of 44 membrane modules, and a retentate separation stage (2) of 100 membrane modules.

The following Table 8 shows the process parameters and the result.

Comparative Example 6

Example 3 was repeated, except that the retentate stream (7) was not heated. Comparative example 6 corresponds to example 16 of U.S. Pat. No. 6,565,626.

The following Table 9 shows the process parameters and the result.

Comparative Example 6 resulted in lower methane purity compared with Example 3, which shows that heating the retentate of the feed stream separation stage (1) before feeding it to the retentate separation stage (2) improves the methane purity of the retentate stream of the retentate separation stage (2).

TABLE 1

Example 1

| Location | Mixing tank: Biogas | Mixing tank: Circulation | Mixing tank: Mixing | Feed separation stage (12 modules): Feeding | Feed separation stage (12 modules): Retentate | Feed separation stage (12 modules): Permeate (Offgas) | Retentate separation stage (24 modules): Feeding | Retentate separation stage (24 modules): Retentate (Product) | Retentate separation stage (24 modules): Permeate |
|---|---|---|---|---|---|---|---|---|---|
| Pressure [Bar] | 1 | 1 | 13 | 13 | 13 | 1 | 13 | 13 | 1 |
| Flow [$Nm^3$/h] | 1,000 | 284 | 1,284 | 1,284 | 883 | 401 | 883 | 598 | 284 |
| Temperature [° C.] | | | | 25 | 21 | 21 | 50 | 47 | 48 |
| Composition [V/V] | | | | | | | | | |
| $CH_4$ | 60.0% | | 53.6% | | | 4.4% | | 97.3% | 30.9% |
| $CO_2$ | 40.0% | | 46.4% | | | 95.6% | | 2.7% | 69.1% |
| Circulation | 28.4% | | | | | | | | |
| Methane Yield | 97.1% | | | | | | | | |

TABLE 2

Comparative Example 1

| Location | Mixing tank: Biogas | Mixing tank: Circulation | Mixing tank: Mixing | Feed separation stage (12 modules): Feeding | Feed separation stage (12 modules): Retentate | Feed separation stage (12 modules): Permeate (Offgas) | Retentate separation stage (24 modules): Feeding | Retentate separation stage (24 modules): Retentate (Product) | Retentate separation stage (24 modules): Permeate |
|---|---|---|---|---|---|---|---|---|---|
| Pressure [Barg] | 1 | 1 | 13 | 13 | 13 | 1 | 13 | 13 | 1 |
| Flow [$Nm^3$/h] | 1000 | 200 | 1200 | 1200 | 810 | 390 | 810 | 610 | 200 |
| Temperature [° C.] | | | | 25 | 21 | 21 | 21 | 18 | 16 |
| Composition [V/V] | | | | | | | | | |
| $CH_4$ | 60.0% | | 53.6% | | | 4.5% | | 95.4% | 21.5% |
| $CO_2$ | 40.0% | | 46.4% | | | 95.5% | | 4.6% | 78.5% |
| Circulation | 20.0% | | | | | | | | |
| Methane Yield | 97.1% | | | | | | | | |

TABLE 3

Comparative Example 2

| Location | Mixing tank: Biogas | Mixing tank: Circulation | Mixing tank: Mixing | Feed separation stage (12 modules): Feeding | Feed separation stage (12 modules): Retentate | Feed separation stage (12 modules): Permeate (Offgas) | Retentate separation stage (24 modules): Feeding | Retentate separation stage (24 modules): Retentate (Product) | Retentate separation stage (24 modules): Permeate |
|---|---|---|---|---|---|---|---|---|---|
| Pressure [Barg] | 1 | 1 | 13 | 13 | 13 | 1 | 13 | 13 | 1 |
| Flow [$Nm^3$/h] | 1000 | 213 | 1213 | 1213 | 790 | 423 | 790 | 577 | 213 |
| Temperature [° C.] | | | | 50 | 46 | 46 | 46 | 44 | 44 |
| Composition [V/V] | | | | | | | | | |
| $CH_4$ | 60.0% | | 57.4% | | | 8.3% | | 97.9% | 39.4% |
| $CO_2$ | 40.0% | | 43.6% | | | 91.7% | | 2.1% | 60.6% |
| Circulation | 21.3% | | | | | | | | |
| Methane Yield | 94.1% | | | | | | | | |

TABLE 4

| Comparative Example 3 | | | | | | | | | |
|---|---|---|---|---|---|---|---|---|---|
| | | | | Feed separation stage (18 modules) | | | Retentate separation stage (18 modules) | | |
| | Mixing tank | | | | | Permeate | | Retentate | |
| Location | Biogas | Circulation | Mixing | Feeding | Retentate | (Offgas) | Feeding | (Product) | Permeate |
| Pressure [Barg] | 1 | 1 | 13 | 13 | 13 | 1 | 13 | 13 | 1 |
| Flow [$Nm^3/h$] | 1000 | 152 | 1152 | 1152 | 737 | 415 | 737 | 585 | 152 |
| Temperature [° C.] | | | | 25 | 21 | 21 | 50 | 48 | 48 |
| Composition [V/V] | | | | | | | | | |
| $CH_4$ | 60.0% | | 58.2% | | | 7.1% | | 97.5% | 46.0% |
| $CO_2$ | 40.0% | | 41.8% | | | 92.9% | | 2.5% | 54.0% |
| Circulation | 15.2% | | | | | | | | |
| Methane Yield | 95.1% | | | | | | | | |

TABLE 5

| Comparative Example 4 | | | | | | | | | |
|---|---|---|---|---|---|---|---|---|---|
| | | | | Feed separation stage (12 modules) | | | Retentate separation stage (12 modules) | | |
| | Mixing tank | | | | | Permeate | | Retentate | |
| Location | Biogas | Circulation | Mixing | Feeding | Retentate | (Offgas) | Feeding | (Product) | Permeate |
| Pressure [Barg] | 1 | 1 | 13 | 13 | 13 | 1 | 13 | 13 | 1 |
| Flow [$Nm^3/h$] | 1000 | 245 | 1245 | 1245 | 844 | 401 | 844 | 599 | 245 |
| Temperature [° C.] | | | | 25 | 21 | 21 | 21 | 17 | 19 |
| Composition [V/V] | | | | | | | | | |
| $CH_4$ | 60.0% | | 53.1% | | | 4.4% | | 97.3% | 24.8% |
| $CO_2$ | 40.0% | | 46.9% | | | 95.7% | | 2.7% | 75.2% |
| Circulation | 24.5% | | | | | | | | |
| Methane Yield | 97.1% | | | | | | | | |

TABLE 6

| Comparative Example 5 | | | | | | | | | | | | |
|---|---|---|---|---|---|---|---|---|---|---|---|---|
| | | | | Feed separation stage | | | Retentate separation stage (23 modules) | | | Permeate separation stage (23 modules) | | |
| | Mixing tank | | | (23 modules) | | | | Retentate | | | | Permeate |
| Location | Biogas | Circulation | Mixing | Feeding | Retentate | Permeate | Feeding | (Product) | Permeate | Feeding | Retentate | (Offgas) |
| Pressure [Barg] | 1 | 1 | 16 | 16 | 16 | 3.6 | 16 | 16 | 1 | 3.6 | 3.6 | 1 |
| Flow [$Nm^3/h$] | 1000 | 262 | 1262 | 1262 | 813 | 449 | 813 | 613 | 200 | 449 | 62 | 387 |
| Temperature [° C.] | | | | 25 | 21 | 21 | 20 | 16 | 16 | 21 | 21 | 21 |
| Composition [V/V] | | | | | | | | | | | | |
| $CH_4$ | 60.0% | | | | | | | 97.1% | | | | 1.2% |
| $CO_2$ | 40.0% | | | | | | | 2.9% | | | | 98.8% |
| Circulation | 26.2% | | | | | | | | | | | |
| Methane Yield | 99.2% | | | | | | | | | | | |

TABLE 7

| Example 2 | | | | | | | | | |
|---|---|---|---|---|---|---|---|---|---|
| | | | | Feed separation stage (11 modules) | | | Retentate separation stage (25 modules) | | |
| | Mixing tank | | | | | Permeate | | Retentate | |
| Location | Biogas | Circulation | Mixing | Feeding | Retentate | (Offgas) | Feeding | (Product) | Permeate |
| Pressure [Barg] | 1 | 1 | 13 | 13 | 13 | 1 | 13 | 13 | 1 |
| Flow [$Nm^3/h$] | 1000 | 359 | 1359 | 1359 | 955 | 404 | 955 | 596 | 359 |
| Temperature [° C.] | | | | 25 | 21 | 21 | 50 | 47 | 47 |
| Composition [V/V] | | | | | | | | | |
| $CH_4$ | 60.0% | | 52.4% | | | 4.8% | | 97.4% | 31.3% |
| $CO_2$ | 40.0% | | 47.6% | | | 95.2% | | 2.6% | 68.7% |
| Circulation | 35.9% | | | | | | | | |
| Methane Yield | 96.8% | | | | | | | | |

TABLE 8

| Example 3 | | | | | | | | | |
|---|---|---|---|---|---|---|---|---|---|
| | Mixing tank | | | Feed separation stage (44 modules) | | | Retentate separation stage (100 modules) | | |
| Location | Natural gas | Circulation | Mixing | Feeding | Retentate | Permeate (Offgas) | Feeding | Retentate (Product) | Permeate |
| Pressure [bar] | 1 | 1 | 55.2 | 55.2 | 55.2 | 13.8 | 55.2 | 55.2 | 13.8 |
| Flow [$Nm^3/h$] | 1180 | 1676 | 2856 | 2856 | 2254 | 602 | 2254 | 578 | 1676 |
| Temperature [° C.] | | | | 25 | 22 | 24 | 50 | 25 | 47 |
| Composition [V/V] | | | | | | | | | |
| $CH_4$ | 80.0% | | 79.4% | | | 62.9% | | 98.0% | 79.0% |
| $N_2$ | 20.0% | | 20.6% | | | 37.1% | | 2.0% | 21.0% |
| Circulation | 142% | | | | | | | | |
| Methane Yield | 60.0% | | | | | | | | |

TABLE 9

| Comparative Example 6 | | | | | | | | | |
|---|---|---|---|---|---|---|---|---|---|
| | Mixing tank | | | Feed separation stage (44 modules) | | | Retentate separation stage (100 modules) | | |
| Location | Natural gas | Circulation | Mixing | Feeding | Retentate | Permeate (Offgas) | Feeding | Retentate (Product) | Permeate |
| Pressure [bar] | 1 | 1 | 55.2 | 55.2 | 55.2 | 13.8 | 55.2 | 55.2 | 13.8 |
| Flow [$Nm^3/h$] | 1180 | 861 | 2041 | 2041 | 1463 | 590 | 1463 | 590 | 861 |
| Temperature [° C.] | | | | 25 | 21 | 24 | 21 | 3 | 19 |
| Composition [V/V] | | | | | | | | | |
| $CH_4$ | 80.0% | | 79.3% | | | 63.9% | | 96.0% | 78.3% |
| $N_2$ | 20.0% | | 20.7% | | | 36.1% | | 4.0% | 21.7% |
| Circulation | 73% | | | | | | | | |
| Methane Yield | 60.0% | | | | | | | | |

The invention claimed is:

1. An apparatus, comprising:

(i) a feed stream separation stage and a retentate separation stage which are membrane separation stages, wherein the feed stream separation stage is configured to separate a feed stream comprising at least two components into a first permeate stream and a first retentate stream, wherein the retentate separation stage is configured to separate the first retentate stream into a second permeate stream and a second retentate stream, and wherein the second permeate stream being combined with a raw gas stream to provide the feed stream;

(ii) at least one device selected from the group consisting of a compressor arranged upstream of the feed stream separation stage, a vacuum device arranged in a permeate stream of the feed stream separation stage, and a vacuum device arranged in a retentate stream of the retentate separation stage;

(iii) a heater arranged between the feed stream separation stage and the retentate separation stage; and (iv) optionally a purification treatment upstream of the feed stream separation stage;

wherein the membranes of the retentate separation stage have a higher total capacity, measured for nitrogen Grade 4.8 under standard conditions, than the membranes of the feed stream separation stage, and wherein the retentate separation stage comprises a back pressure regulating valve in the second retentate stream, configured to adjust the retentate pressure to 1 to 100 bar.

2. The apparatus of claim 1, wherein a ratio of the total capacity of the membranes of the retentate separation stage to the total capacity of the membranes of the feed stream separation stage is in a range of from 1.05 to 10.

3. The apparatus of claim 1, wherein the membranes of the feed stream separation stage have a pure gas selectivity for carbon dioxide over methane of at least 30.

4. The apparatus of claim 1, wherein the material of a separation-active layer of the membranes is at least one selected from the group consisting of a polyamide, a polyetherimide, a polyaramide, a polybenzoxazole, a polybenzothiazole, a polybenzimidazole, a polysulfone, a cellulose acetate, a cellulose acetate derivative, a polyphenylene oxide, a polysiloxane, a polymer with intrinsic microporosity, a mixed matrix membrane, a facilitated transport membrane, a polyethylene oxide, a polypropylenexide, and a polyimide.

5. The apparatus of claim 4, wherein said material is a polyimide consisting of the monomer units A and B:

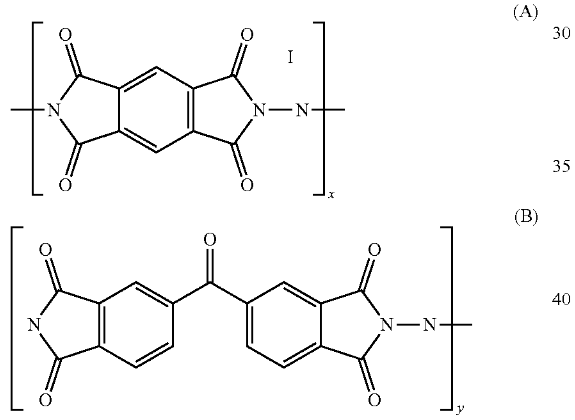

where x is from 0 to 0.5 and y is from 0.5 to 1, and R is the same or different radical selected from the group consisting of radicals L1, L2, L3 and L4:

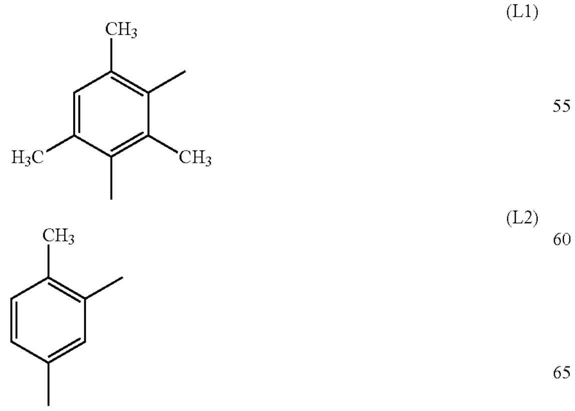

-continued

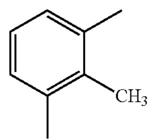

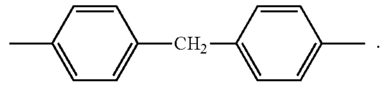

6. The apparatus of claim 1, wherein the compressor is present, and is a multistage compressor, and optionally the second permeate stream is introduced into the compressor between two compression stages.

7. The apparatus of claim 1, wherein the membrane separation stages consist of hollow fiber gas separation membrane modules.

8. A process for separating gases, carried out in an apparatus comprising:

(i) a feed stream separation stage and a retentate separation stage which are membrane separation stages, the membranes of the retentate separation stage having a higher total capacity, measured for nitrogen Grade 4.8 under standard conditions, than the membranes of the feed stream separation stage;

(ii) at least one device selected from the group consisting of a compressor arranged upstream of the feed stream separation stage, a vacuum device arranged in a permeate stream of the feed stream separation stage, and a vacuum device arranged in a retentate stream of the retentate separation stage;

(iii) a heater arranged between the feed stream separation stage and the retentate separation stage; and (iv) optionally a purification treatment upstream of the feed stream separation stage;

the process comprising:

separating a feed stream comprising at least two components into a first permeate stream and a first retentate stream in the feed stream separation stage, separating the first retentate stream into a second permeate stream and a second retentate stream in the retentate separation stage;

removing the first permeate stream as a first product, further processing the first permeate stream, or, if the second retentate stream is removed or further processed, discarding the first permeate stream;

removing the second retentate stream as a second product, further processing the second retentate stream, or, if the first permeate stream is removed or further processed, discarding the second retentate stream;

combining the second permeate stream with the feed stream; and heating the first retentate stream to a temperature higher than the temperature of the feed stream, before introducing the first retentate stream to the retentate separation stage.

9. The process of claim 8, wherein a ratio of the total capacity of the membranes of the retentate separation stage to the total capacity of the membranes of the feed stream separation stage is in a range of from 1.05 to 10.

10. The process of claim 8, wherein the membranes of the feed stream separation stage have a pure gas selectivity for carbon dioxide over methane of at least 30.

11. The process of claim 8, wherein the material of a separation-active layer of the membranes is at least one selected from the group consisting of a polyamide, a polyetherimide, a polyaramide, a polybenzoxazole, a polybenzothiazole, a polybenzimidazole, a polysulfone, a cellulose acetate, a cellulose acetate derivative, a polyphenylene oxide, a polysiloxane, a polymer with intrinsic microporosity, a mixed matrix membrane, a facilitated transport membrane, a polyethylene oxide, a polypropylenexide, and a polyimide.

12. The process of claim 11, wherein said material is a polyimide consisting of the monomer units A and B:

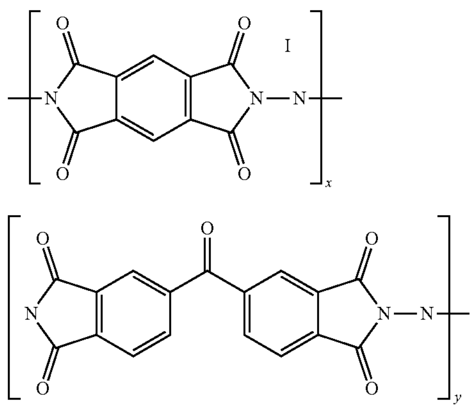

where x is from 0 to 0.5 and y is from 0.5 to 1, and R is the same or different radical selected from the group consisting of radicals L1, L2, L3 and L4:

(L1)

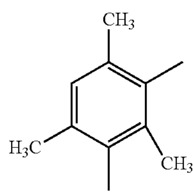

(12)

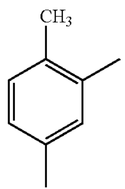

-continued (L3)

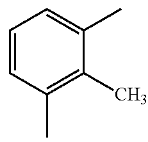

(L4)

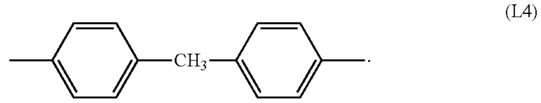

13. The process of claim 8, wherein the compressor is present, and is a multistage compressor, and optionally the second permeate stream is introduced into the compressor between two compression stages.

14. The process of claim 8, wherein the membrane separation stages consist of hollow fiber gas separation membrane modules.

15. The process of claim 8, further comprising adjusting the retentate pressure of the retentate separation stage with a back pressure regulating valve in the second retentate stream to 1 to 100 bar.

16. The process of claim 8, wherein the driving force used for the separation task is a partial pressure difference of the permeate gas between the retentate side and the permeate side in the respective membrane separation stages which is generated by a compressor in the feed stream, by a vacuum device in the second permeate stream, by a permeate-side flushing-gas stream, or a combination thereof.

17. The process of claim 8, wherein the first retentate stream is heated to a temperature 5 to 50° C. higher than the temperature of the feed stream before the first retentate stream is introduced to the retentate separation stage.

18. The process of claim 8, wherein the temperature of the feed stream is in the range of from 15 to 45° C. before the feed stream is introduced to the feed stream separation stage.

19. The process of claim 8, wherein the gas volume recycled with the second permeate stream totals less than 40% by volume of the raw gas stream.

20. The process of claim 8, wherein the raw gas stream is selected from the group consisting of a biogas, a natural gas, air, a gas mixture comprising carbon dioxide and methane, a gas mixture comprising hydrogen and methane, a gas mixture comprising carbon monoxide and methane, a gas mixture comprising helium and methane, a gas mixture comprising helium and nitrogen, a gas mixture comprising hydrogen and carbon monoxide, a gas mixture comprising a permanent gas having a boiling point of less than 110 K at 1 atm and a non permanent gas having a boiling point above or equal to 110 K at 1 atm, a gas mixture comprising carbon dioxide and a hydrocarbon, and a gas mixture comprising nitrogen and a hydrocarbon.

* * * * *